United States Patent [19]

Fargier et al.

[11] Patent Number: 4,809,824
[45] Date of Patent: Mar. 7, 1989

[54] METHOD AND DEVICE FOR ACTUATING A BRAKING MECHANISM BY A ROTATING ELECTRIC MOTOR

[75] Inventors: Eric Fargier, Neuilly-Plaisance; Pierre Pressaco, La Courneuve, all of France

[73] Assignee: Bendix France, Drancy, France

[21] Appl. No.: 142,373

[22] Filed: Jan. 11, 1988

[30] Foreign Application Priority Data

Jan. 22, 1987 [FR] France ................... 87 00707

[51] Int. Cl.⁴ .................................................. F16D 65/34
[52] U.S. Cl. ........................... 188/72.8; 188/106 P; 188/162; 188/72.1; 74/424.8 B
[58] Field of Search ............. 188/72.1, 72.8, 71.2, 188/162, 106 P; 74/424.8 B; 303/DIG. 3

[56] References Cited

U.S. PATENT DOCUMENTS

| | | | |
|---|---|---|---|
| 2,039,509 | 5/1936 | Adams | 188/3 |
| 2,502,573 | 4/1950 | Lee | 74/424.8 B |
| 2,547,079 | 4/1951 | Gerentes | 74/424.8 B |

FOREIGN PATENT DOCUMENTS

| | | |
|---|---|---|
| 109918 | 5/1984 | European Pat. Off. . |
| 125870 | 11/1984 | European Pat. Off. . |
| 155417 | 9/1985 | European Pat. Off. . |
| 2156021 | 10/1985 | United Kingdom . |

*Primary Examiner*—George E. A. Halvosa
*Attorney, Agent, or Firm*—Larry J. Palguta; Ken C. Decker

[57] ABSTRACT

The actuating device of a braking mechanism comprises an electric driving motor and a gear pinion meshing with a first gear wheel integral with a screw screwed into a nut pressing on a plunger for application of the brake. The nut 13 carries a second gear wheel 22 having number of teeth which differs very slightly from that of the first gear wheel 31, for example by one tooth, to make a drive system with this first wheel in differential translation of the nut 13. Application to an electrically controlled and quick release brake.

7 Claims, 3 Drawing Sheets

METHOD AND DEVICE FOR ACTUATING A BRAKING MECHANISM BY A ROTATING ELECTRIC MOTOR

The present invention relates to a method of actuating a braking system comprising a screw and a nut screwed on this screw and able to press axially on a plunger acting on brake pads arranged so as to be applied on a member to be braked. It also concerns the device for implementing the method and comprising a plunger moving in translation to apply the friction pads on at least one member to be braked, a nut able to press on this plunger in translation and screwed on a screw driven in rotation by a first coaxial gearwheel turning at a first angular speed due to the action of a motor, to move the nut and the plunger at a first linear speed.

For a long time, attempts have been made to design the braking of various wheeled vehicles using electric braking motors which would take the place of fluid, oil or compressed-air motors, used generally up to now for the braking of light road vehicles such as private cars, or heavier road vehicles such as industrial vehicles or railway wagons. Independent of these devices being less reliable due to the permanent risk of a break in the electrical circuit which is more fragile than a fluid circuit, other design difficulties have contributed to make the brakes with electric motors less practical in comparison with brakes with fluid motors.

Thus, for example, the electric motor brake for a heavy goods vehicle and its trailer described in U.S. Pat. No. 039,509 offered the advantage of replacing the fluid connecting pipes between the two vehicles by an electrical circuit and to obtain simultaneous actuations of the brakes of the tractor vehicle and of the trailer. Such a brake which used wheel reduction gears and worm gears and rack and pinion systems for the mechanical connection between the rotating electric motor and the brake linkage rod, showed itself to have an hysteresis for the application-release actuation which eliminated practically all progressiveness during braking.

More recently, a proposition was made to produce brakes controlled by electric motors using a braking plunger driven axially by a ball bearing screw which has low actuating hysteresis (better, nevertheless, than that of the best fluid motors) and which can be reversible, which helps the release of the brakes under the effect of the force of reaction to the application of the brake pads. These electric brake motors with drive by a ball bearing screw have again been found to be inferior to known fluid controls because, either the pitch of the ball bearing screw is too long and allows brake application loads to be obtained only at the cost of an excessive bulkiness, or when the ball bearing screw is more compact, the release of the brakes is found to be "lazy" as a result of difficulties in getting the screw to rotate under the force of reaction only and the response times for application (in the case where there is considerable play to take up) and for release are too long.

The present invention aims to mitigate the above-mentioned disadvantages of brakes having an electric motor and drive by ball bearing screw and to obtain an actuating mechanism of a brake which is at one and the same time relatively unaffected by operational clearances on application of the brakes and suited to offer a good moderation of braking, better, if possible, than that for fluid brakes, and a very fast release of the brakes, particularly so as to be able to incorporate it in a brake anti-locking or anti-skidding circuit.

The objects of the invention are attained with a method in which the screw is driven by a motor at a first angular speed, so as to move the nut and the plunger axially at a first linear speed following the axis of the screw, to apply the brake pads on the member to be braked and, simultaneously, the nut is driven at a second angular speed less than the first, so as to move the plunger axially at a linear speed differentially proportional to the difference of these angular speeds when the application load of the brake pads on the member to be braked is in the increasing phase.

According to another embodiment of the method, the screw is coupled to a coaxial gearwheel driven by a motor, in particular an electric motor, to make the screw turn at the first angular speed, the application load of the brake pads on the member to be braked is measured and the gear-wheel is disconnected from the screw when this load exceeds a predetermined threshold. The application load is thus made relatively independent of the instantaneous output of the screw.

To ensure a fast release of the brake, the nut is coupled to a second coaxial gearwheel driven by the motor to make the nut turn at the second angular speed, the load applied on the member to be braked is measured and the driving couple of the motor is discontinued when this load becomes zero, during a total release phase of the braking mechanism.

In order to benefit from a strong amplification of the application loads, a translation of the plunger at slow speed is induced in the direction of the application of the brake pads when the application load of the brake pads on the member to be braked is in the increasing phase, by choosing closely related values for the first and the second angular speeds.

According to another embodiment of the method, the force of reaction to the load applied by the brake pads on the member to be braked is transmitted axially by the plunger to the second gearwheel in rotation to connect this automatically to the nut by friction.

According to an embodiment of the method of the invention considerably improving the sensitivity of braking, the screw nd the motor are connected in rotation by excitation of an electro-magnetic clutch. The nut is then screwed on the screw in a reversible manner in a direct non-differential screwing manner and, to release the brakes, the disengagement of the clutch is first of all triggered, thus freeing the screw in rotation in order that the force of reaction applied to the plunger causes the screw to start rotating in the direction of release of the brakes.

According to yet another embodiment to make a parking brake, a service braking is triggered at differential linear speed, then the screw is locked in rotation mechanically.

In variation, the axial application load of the brake pads is detected by the reaction applied to the screw and the clutch is disengaged when the application load of the brake exceeds a predetermined instruction of threshold value.

According to a more complex use of the method according to the invention, the electro-magnetic clutch is de-excited and re-excited alternately while the motor remains in driving phase, during a skidding phase or locking of the wheel or wheels of a braked vehicle by the braking mechanism, so as to cause alternately the release of the brakes by freeing the screw, followed by the reapplication of braking via the motor which once again drives the plunger in translation at differential speed for brake application.

Fast alternations of excitation-de-excitation of the electro-magnetic clutch are undertaken, so as to transmit a reduced driving couple to the screw corresponding closely to the grip available for the friction braking on the wheels of a vehicle braked by the braking mechanism.

In the method according to the invention, during a total release phase of the brakes, the clutch is disengaged, the axial application load of the brake is monitored and the current supply to the motor is cut off only when a low or zero residual application load is detected. The free rotation of the screw combines with the drive of the nut in rotation by the motor via the second gearwheel under the effect of the reaction force of the application plunger, to release the brake.

The device for implementing the method according to the invention is characterized in that it comprises a second wheel driven by the same motor and fitted to rotate on the nut coaxially to it, a means of connecting the second wheel and the nut in rotation due to the action of the load transmitted by the plunger to this gearwheel when the brake pads apply a load on the member to be braked, the nut and the second wheel then being driven in rotation by the motor at a second angular speed less than the first angular speed to move the nut and the plunger at a second linear speed proportional to the difference of these angular speeds, so as to ensure an amplification of the application load of the brake pads by differential effect.

A pinion ensures the connection of the motor simultaneously with the first and second gearwheels, fitted coaxially to the screw, the number of teeth of the second gearwheel being very slightly more than that of the first to permit the coaxial rotation of these two wheels in spite of this difference in the number of teeth.

The screwing of the screw in the nut is achieved by means of a member with reversible thread, for example a ball bearing track, and the connection between the pinion shaft and the screw via the pinion and the first gearwheel, comprises a clutch which is preferably an electrically actuated electromagnetic clutch with low response time able to be engaged in an application phase of the brakes and to be disengaged in a release phase of the brakes by permitting the free rotation of the screw then reversible, due to the effect of the reaction force exerted on the application plunger.

The service brake is triggered and a mechanical locking component of the clutch is actuated in engaged position or in locked position to make a parking brake, this mechanical member thus locking the screw and the nut to prevent the release of the brake. The coupling of the two gearwheels on the same pinion also mechanically resists release of the brake applied initially by electrical means.

According to two different embodiments, the first gearwheel is fitted idling on the screw and is able to be connected in rotation to the screw by the clutch, or alternatively the first gearwheel is integral in rotation with the screw and meshes with a part of the pinion which is able to be connected in rotation to the pinion shaft via the clutch which is an electrically actuated electromagnetic clutch and with a low response time.

The second gearwheel is able to be gripped between the annular shoulder surface of the nut and a ring of bearing components, for example balls or rollers or needles, pressing on the annular shoulder surface of the application plunger surrounding a part of the nut.

A compression spring is inserted between a thrust surface of the application plunger and the nut, so as to push this nut back to contact an internal stop integral with the said plunger and to create a couple of low minimum friction between the nut and the application plunger.

Other aims, advantages and features will be apparent on reading the description of various embodiments of the invention, which is non-limiting and takes into account the attached drawings, in which:

FIG. 4 shows, in partial section view according to the plane IV—IV in FIG. 5, the motor of the actuating mechanism of the brake caliper and its kinematic outlet link;

FIG. 5 shows the end view of the actuating mechanism, casing removed, to illustrate the tangential links of the gearwheels.

Figure 1:
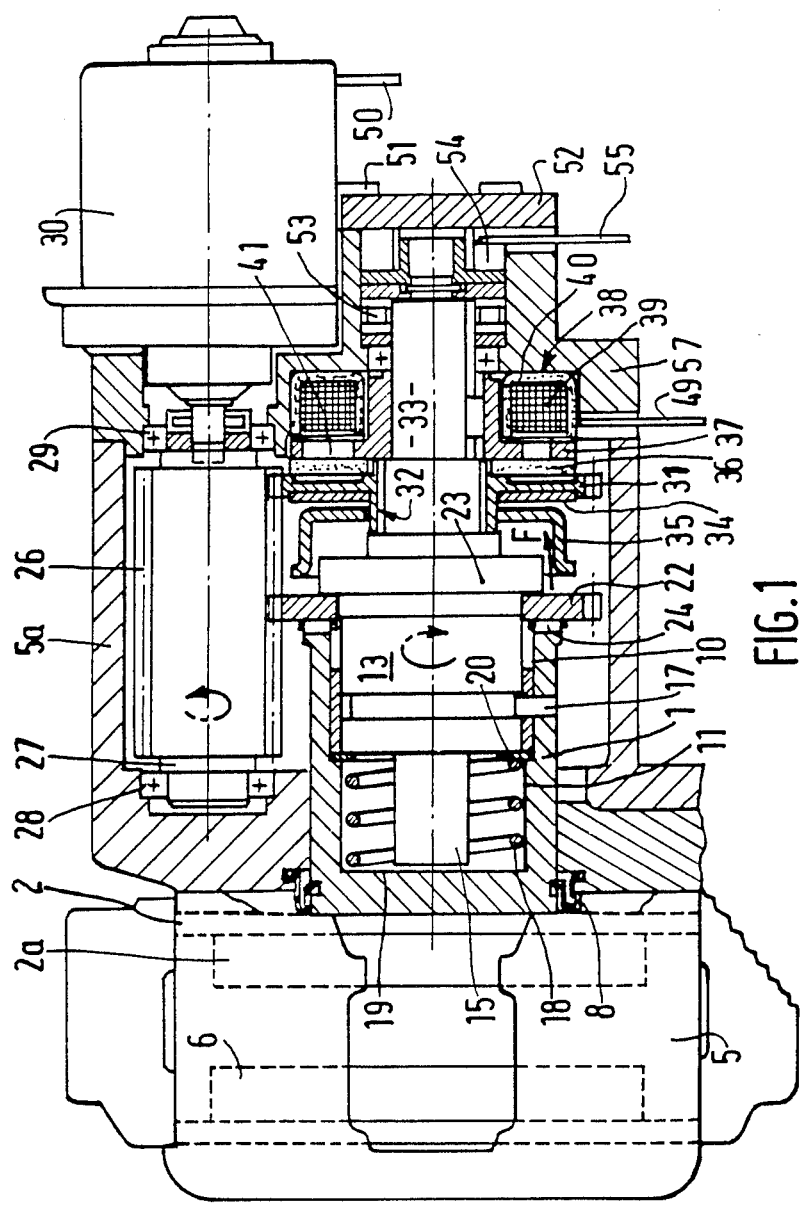
FIG. 1 is a view in longitudinal section of a first embodiment according to the invention of an actuating mechanism for a brake caliper, the electric driving motor being shown.
Figure 2:
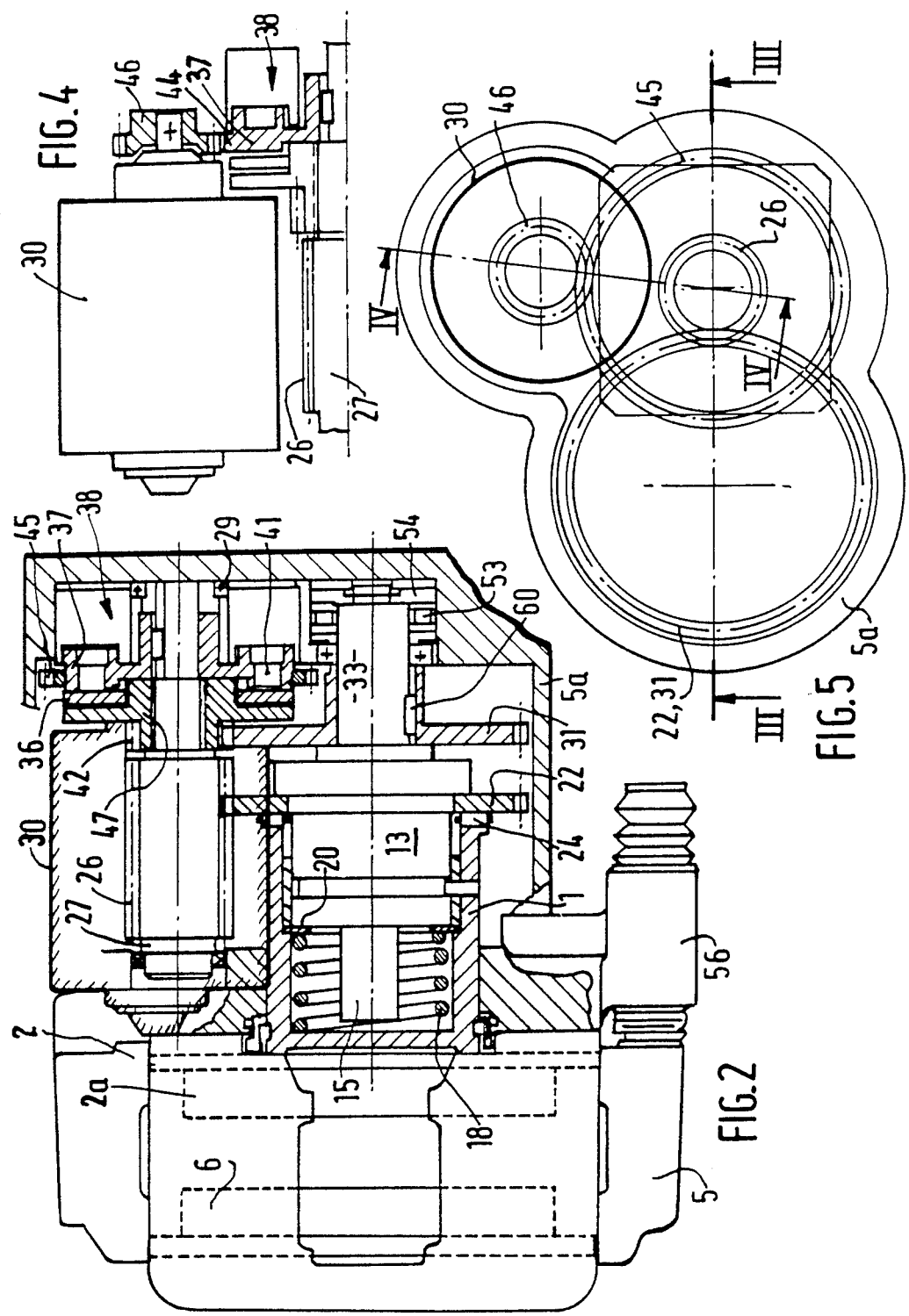
FIG. 2 shows, in longitudinal section, another embodiment according to the invention of an actuating mechanism for a brake caliper where the electric motor is external to the sectional plan and the clutch is located on the pinion axis.
Figure 3:
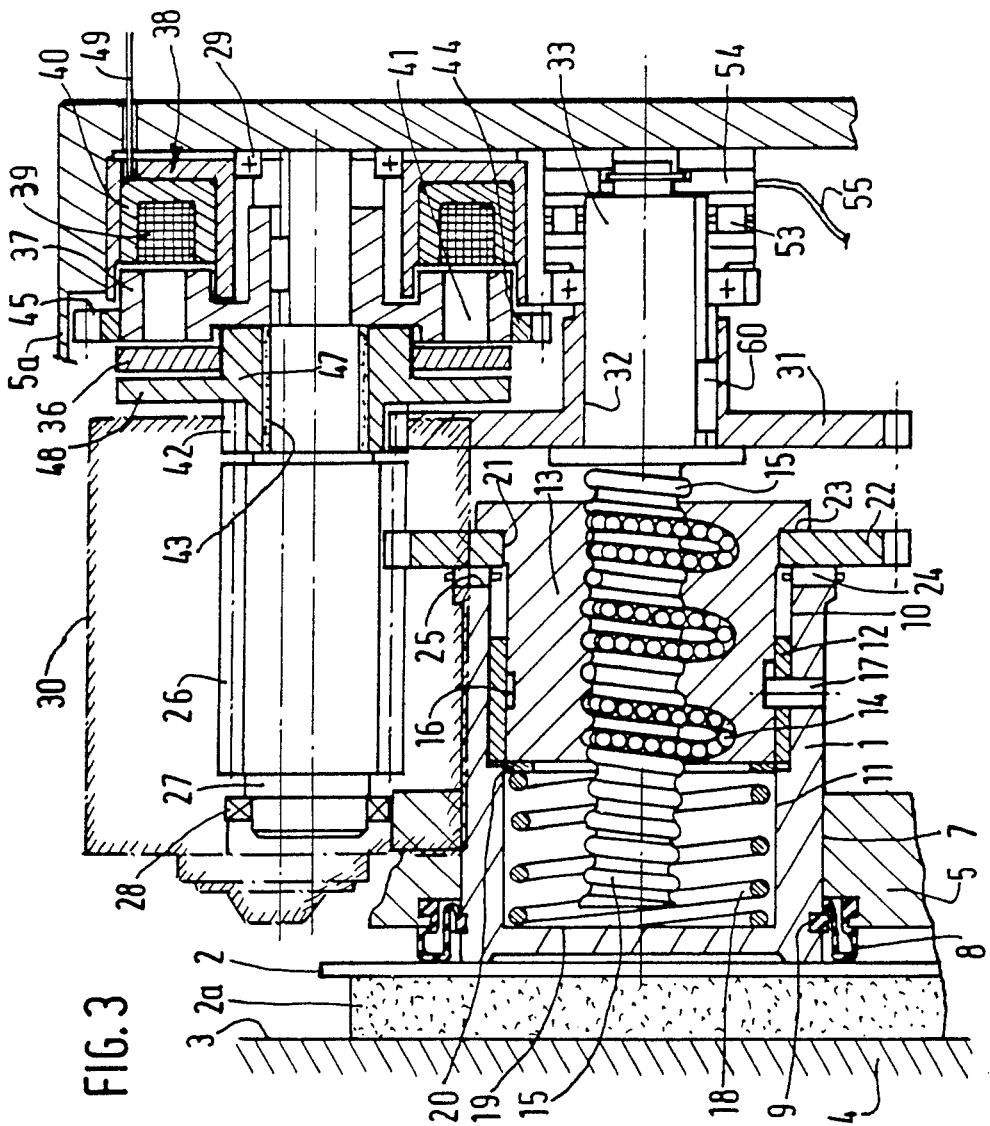
FIG. 3 shows, in section on a much larger scale with some components omitted, the actuating mechanism of FIG. 2 according to the plane III—III in FIG. 5.

If reference is made more particularly to FIGS. 1 to 3 where similar components have the same reference markings, it is seen that the actuating mechanism of the disc-brake caliper aims to act by a plunger 1 to push a brake lining pad 2 forward to contact the friction track 3 of a disc brake 4 and, by reaction, pull on the brake caliper 5 (see FIG. 1) to make it push a second brake friction pad 6 forward and lay it on a second friction track of the disc (not shown), in order to grip both faces of the disc simultaneously.

The plunger 1 is guided in a bore 7 of the caliper 5 and moves in the direction of the friction pad 2. The bore 7 is protected from any risk of penetration by polluting matter due to the insertion of a resilient annular bellows 8 between a peripheral outlet groove 9 of the plunger and the caliper 3.

The plunger 1 has two stepped bores 10 and 11 inside and is fitted with a ball bearing nut 13 in the bore 10 via an intermediate brush 12. This nut 13 has, inside several ball tracks 14, closed on themselves and in contact with which a ball bearing screw 15 with radiused threads of relatively coarse pitch, for example about 5 mm left-hand thread in the embodiments in FIGS. 1 to 3, is screwed. The nut 13 has an inner annular groove 16 in which a peg 17 integral with plunger 1 engages. In the rest position, the nut 13 is pushed back, by the side of the groove 16, against the peg 17, by a compression spring 18 inserted between the bottom 19 of the bore 11 and a friction washer 20 applied on the nut 13.

The nut 13 has on its external surface a bearing 21 on which a gearwheel 22, which will be called the second gearwheel later on, is slideably fitted and which is inserted between an annular shoulder surface 23 of the nut 13 and a track ring for bearing components 24 pressing on an annular shoulder surface 25 of the plunger 1. The gearwheel 22 meshes with a pinion 26 of which the pinion shaft 27 has long straight or slightly inclined helical teeth, and whose length corresponds to the axial movement of the nut 13 and of the wheel 22 which it carries. This length of axial movement takes into account the normal operating travel of the plunger as well as the gradual wear of the brake pads which develops in the course of time and which moves the point of operation of the plunger towards the left on FIGS. 1 to 3. The shaft 27 of pinion 26 is guided in rotation in bearings 28 and 28 made integral with a mechanism body 5a and is connected mechanically to a driving motor 30. The driving motor 30 may be of various types. For example, a magnet DC motor delivering a coupled appreciably proportional to the electric control current may be used. In other embodiments, a multiphase induction motor could be used or even a stepped motor.

According to the embodiment of FIG. 1, the pinion shaft 27 is seen to be coupled direct to the electric driving motor in rotation 30. The teeth of pinion 26 mesh with another gearwheel 31 which will be called the first gearwheel later on and which is fitted idling, via a self-lubricating bush, on a bearing 32 of the screw shaft 33 which extends the screw 15 beyond the annular shoulder surface 23. The first gearwheel 31 has an inner friction ring 34 on a lateral face designed to accept the thrust of a locking member 35 controlled by the parking brake lever. The first gearwheel 31 is connected, on the other lateral face, by resilient thin strips (not shown) to a clutch disc 36 in a material of good magnetic permeability, for example in mild steel, and which is capable of being attracted by magnetism to a clutch plate 37 of good magnetic permeability of an electro-magnetic clutch 38. The clutch plate 37 is keyed to the screw shaft 33 via a hub which surrounds the shaft 33 inside an electrical winding of clutch 39 located inside a "U" section ring 40 whose two sides, which guide respectively the inner magnetic flux to the winding 39 and the outer flux to this winding, terminate by poles which face the solid sections of the clutch plate 37. A break 41 is provided in the magnetic plate 37 opposite the winding 39 to allow the magnetic flux created by the supply of DC electric current to the winding 39 to form a closed circuit. This break may be made by means such as a connecting ring in non-magnetic material, for example in plastic material or brass, or even by a series of holes which channel the magnetic flux aside from this break by forcing it to close the circuit mainly via the clutch plate 36. In a general way, the clutch 38 is made in the form of an electro-magnetic clutch which is electrically actuated and has a very low response time.

According to an important feature of the braking mechanism according to the invention, the first gearwheel 31 and the second gearwheel 22 which are both fitted coaxially on the screw shaft 33 and which both mesh with the pinion 26, have teeth which differ very slightly in number. According to the embodiment producing the maximum differential effect, the number of teeth of wheels 31 and 22 differ only by one tooth.

In a practical embodiment, a screw 15 having a 5 mm pitch and a pinion 26 with sixteen teeth meshing with a first wheel 31 with thirty-eight teeth and with a second wheel 22 with thirty-nine teeth are used. In order to obtain a first and a second wheel of the same primitive circle and whose number of teeth are thirty-eight and thirty-nine respectively, gear cutting may be undertaken with tooth correction by offsetting the gear cutting rack in relation to the center of the gear cutting center. When the wheels 31 and 22 are both meshed on the pinion 26, according to the same primitive circle because they are coaxial, their pressure angles in service are different.

In the embodiment shown on FIGS. 2 and 3, the first gearwheel 31 is keyed onto the screw shaft 33 at 60 and meshes with a part of idler pinion 42 via a thin bearing 43 on the pinion shaft 27 on which a clutch plate 37 is keyed which has a ring 44 with teety 45 on its periphery.

As may be seen on FIGS. 4 and 5, the teeth 45 mesh with the output pinion 46 of the electric driving motor 30. The part of idler pinion 42 is integral with a hub 47 which carries, via the resilient strips, the magnetic clutch disc 36 which had good permeability, for example in mild steel, this clutch disc 36 being held axially by an axial supporting disc 48. The clutch 38 is connected to an electrical control box (not shown) by a supply circuit 49, the same thing being arranged for the electric motor 30 by a circuit 50. The motor 30 is, for example flanged onto a closure plate 52 (see FIG. 1) by peripheral lugs 51.

According to another feature of the invention, the screw shaft 33 which supports all the reaction force of plunger 1 axially, that is to say the application load of the brakes, is in axial thrust via an axial bearing 53, for example of rollers, on an axial load detector 54, for example a stress gauge, connected to a control box (not shown) by a circuit 55.

On FIG. 2 it may be seen that the body 5a of the brake actuating mechanism is connected to small mounting pillars 56 of the caliper 5 on a support such as a wheel backplate. In the embodiment of FIG. 1, the electro-magnetic clutch 38 and the axial load detector 54 are carried by a cover 57 added onto the body 5a and which carries, moreover, the electric motor 30 by means of the closure plate 52.

The operation of the braking mechanism driven by an electric motor according to the invention will now be explained in detail.

Reference will be made first of all to FIG. 3 which shows the mechanism on the largest scale. As shown on the figure, it is presumed that the friction pads 2a are new and therefore that the nut 13 is pushed back as far as possible towards the right of the figure. To trigger a braking, for example by means of a potentiometer actuated by the brake pedal, a braking current (which current is generally proportional to the deceleration called for at the brake pedal) is supplied to the brake motor 30 at the same time as standard clutch current to the clutch 38. The motor 30 starts to turn driving the pinion 26 and the part of pinion 42 in rotation via the clutch 38. The first gearwheel 31 is thus driven in rotation with the screw 15 which screws itself into the nut 13, then locked in rotation by the friction of the bottom of spring 18 on the washer 20 and by the friction of the side of the groove 16 on the peg 17 under the action of the compression spring 18. The second gearwheel 22, also driven in rotation by the pinion 26 idles on the bearing 21.

In a particular embodiment, the pinion 26 has sixteen teeth and the first gearwheel 31, thirty-eight teeth. At each turn of the pinion 26, the nut 13 and the plunger 1, via the spring 18, are thus pushed back towards the left by a considerable fraction of the pitch of the screw 15, being as here:

$$5 \text{ mm} \times \frac{16}{38} = 2.105 \text{ mm}$$

The operating clearance between the brake pads 2a and the friction track 3 (normally that of the brake disc) being small, about a few tenths of a millimeter and not more than 1 mm for the brakes on heavy industrial vehicles, the no-load or play take-up travel of the nut 13 is made in a very short time, about a few hundredths of a second, in spite of the rotating inertias brought into play.

As soon as all the play is taken up, a reaction force appears on the plunger 1, this force being exerted by the friction pad 2a pressed hard against the friction track 3. This reaction force or force application of the brakes immediately grips the second gearwheel 22 between the bearing surface 23 of the nut 13 and the bearing comonents 24 which exert only a low friction on the shoulder surface 25 of the plunger 1. The second gearwheel 22 thus finds itself engaged on the nut 13 which then starts to turn at a speed which is slightly less than the speed of the screw 15, that is to say in inverse ratio to the number of teeth on the first and second gearwheels 31 and 22. This inverse ratio was 39/38 in the embodiment envisaged.

The differential screw effect thus reduces the apparent pitch of the screw in the ratio of 1/39 and increases the application load of the brakes by as much, virtually reducing the output of the screw.

As soon as the application load of the brakes occurs, the electric motor 30 exerts, with a low speed advance of the plunger 1 of:

$$5 \text{ mm} \times \frac{16}{38} \times \frac{1}{39} = 5.4$$

hundredths of a mm per revolution of the pinion 26, a very high application load of the brakes.

The sensor 54 for the axial application load of the brakes triggers the cut-off of the excitation to the clutch 38 as soon as the application load exceeds a recommended value given by a braking control or monitoring member.

To bring about the release of the brakes, if the current in the electric motor 30 was cut off first, the release could start only from the moment the clutch 38 became disengaged by de-exciting its winding 39 and the residual magnetism in the magnetic circuit would run the risk of again delaying this disengagement. According to the method of the invention, to release the brakes, the excitation of the electro-magnetic clutch 38 is cut off first of all which prevents the first gearwheel 31 from driving the screw 15 in rotation. The nut 13 is then driven in rotation by the second gearwheel 22 which permits the free rotation of the first gearwheel 31 due to the action of the reaction force exerted on this screw 15 which is then reversible.

When the load sensor 54 has detected the disappearance of the brake application load, the current supply to the motor 30 is then cut off, except of course in the event of a fresh actuation of the brake pedal by the driver. Previously, the nut 13 has continued to turn a short distance by inertia, after the disappearance of the reaction force of the brake pads, which ensures an operating clearance between the friction pads 2a and the friction track 3 on release.

To implement a parking brake action, the application of the brakes is triggered by an ad hoc control commencing with the rotation of the electric motor 30 and then a load is applied in the direction F on the member 35 in FIG. 1, which comprises a load amplifying lever through which a parking brake cable passes. This load F pushes the member 35 up against the frictiion ring 34 which locks the first gearwheel 31 mechanically and forces it to place itself in coupled position on the screw shaft 33. Thus the screw 15 is locked and, furthermore, the two gearwheels 31 and 22 are coupled simultaneously to the pinion 26 and the effect of the differential screw makes the ball bearing screw 13 irreversible which, in any case, prevents the release of the brakes by mechanical means, these brakes having been applied electrically earlier, after the cutting off of the current in the motor 30 and in the clutch 38. If the load F is released after the cutting off of the electrical supply to the electric motor 30 and the clutch 38, the reaction force which exerts itself on the screw 15 causes it to rotate because the freeing of the first wheel 31 makes the screw 15 reversible again and the release of the brakes takes place by reaction to the application load of the brakes.

The braking mechanism according to the invention may be used to achieve a very fast and efficient anti-locking or anti-skidding action of the brakes. For this, a central brake monitoring unit, usually a computer unit with microprocessor, triggers the alternating release of the brake when there is a tendency for one or more braked wheels to lock by the braking mechanism of the invention, which is detected by measuring the abnormal deceleration of the wheel and, should the occasion arise, its relative slip in relation to the road surface.

The release is triggered by de-excitation of the clutch 38, the motor 30 remaining supplied. The de-excitation of the clutch 38 permits the free rotation of the screw 15 while the motor 30 drives only the nut 13 by the pinion 26 and the wheel 22. After a brief release phase, the clutch 38 is re-excited when the threshold of the sensor 54 is reached and the screw-nut assembly 15,13 restarts its differential rotation, to push the nut 13 once again towards the left of the figure.

During the alternating phases of excitation and the cutting off of the clutch 38, which produces a slow brake application, the motor 30 remains live and in rotation in the same direction on application as on release, the clutch 38 brings the clutch disc 36 and the clutch plate 37 into friction contact turning in the same direction at closely related speeds, and thus it is possible to make the clutch beat at high frequencies of the order of 40 to 50 Hz.

Thus, during anti-locking or anti-skidding action of the brakes, brake application effects are obtained which oscillate slightly and become less and less during an anti-locking phase, roundabout an average load value corresponding appreciably to the momentary grip available under the wheels of the braked vehicle.

It will be noted that the elasticity of the brake caliper 5 and the compressibility of the brake pads 2a provide, in general, an elasticity sufficient for the braking mechanism according to the invention so that the progressive applications and releasings of the brake result in not inconsiderable angles of rotation of the electric motor 30 between two stages of braking loads, which may reduce the actuation hysteresis. If the elasticity of the actuating mechanism was found to be insufficient in certain applications, particularly with very firm brake pads, an annular shoulder surface 25 of the application plunger 1 could be provided carried by a supporting member guided on the body of the plunger and capable of moving a short distance in relation to this plunger by compressing resilient members, for example at least one taper washer, under the application load of the brake.

Of course, the present invention is not limited to the embodiments described and shown but is amenable to numerous variations which will be apparent to the person skilled in the art without deviating from the meaning of the invention. In particular it is within the scope of the present invention to substitute an internally toothed ring for pinion (26).

We claim:

1. A braking mechanism, comprising a plunger moving in translation to apply brake pads on at least one member to be braked, a nut able to press on the plunger during translation and disposed on a screw driven in rotation by a first gearwheel turning at a first rotational speed by means of an electric motor in order to move the nut and plunger at a first linear speed, characterized in that the mechanism comprises a second gearwheel driven by the motor and rotatable on the nut with which the second gearwheel is coaxial, means for connecting the second gearwheel and nut in rotatation as a result of loading transmitted by the plunger to the second gearwheel when the brake pads apply a load on the member to be braked, the nut and second gearwheel then being driven in rotation by the motor at a second rotational speed less than the first rotational speed in order to move the nut and plunger at a second linear speed proportional to the difference of the rotational speeds so as to effect an amplification of loading effected by the brake pads on the member to be braked, a pinion effecting simultaneous communication of the motor with the first and second gearwheels which are disposed coaxial to the screw, the number of teeth of the second gearwheel very slightly more than the number of teeth of the first gearwheel to permit coaxial rotation of the gearwheels despite the difference in the number of teeth, threading of the screw in the nut achieved by means of a member with reversible thread, a connection between the pinion and the screw via the first gearwheel comprising a clutch which is engageable during an application phase of braking and disengageable during a release phase of braking, during the release phase of braking the clutch permitting free rotation of the screw which is reversible, the screw rotating reversely due to the effect of reaction force exerted on the plunger, the motor rotating the pinion in the same rotational direction for both phases of braking and the clutch being alternately actuated and deactuated.

2. The braking mechanism according to claim 1, characterized in that the clutch is one of coupled to a mechanical locking member of the clutch in an engaged position and duplicated in parallel by a mechanical clutch unit, and the locking member and mechanical clutch unit capable of being actuated to render movement between the nut and screw irreversible as a result of a differential effect due to a coupling of the gearwheels with the pinion, and thereby resisting mechanically a release of the braking effected initially by the electric motor.

3. The braking mechanism according to claim 1, characterized in that the first gearwheel idles on the screw and is connected in rotation with the screw by means of the clutch.

4. The braking mechanism according to claim 1, characterized in that the first gearwheel is integral in rotation with the screw and meshes with a part off the pinion, the part connected in rotation to a shaft of the pinion via the clutch.

5. The braking mechanism according to claim 1, characterized in that the clutch is in an electro-magnetic clutch with electrical actuation and a low response time.

6. The braking mechanism according to claim 1, characterized in that the connecting means comprises the second gearwheel being engageable between an annular shoulder surface of the nut and bearing means which press on an annular shoulder surface of the plunger.

7. The braking mechanism according to claim 6, characterized in that a compression spring is disposed between the nut and a thrust surface of the plunger so as to bias the nut into contact with an internal stop connected with the plunger and create a connection of low friction between the nut and plunger.

* * * * *